(12) United States Patent
Nakajima

(10) Patent No.: US 11,405,523 B2
(45) Date of Patent: Aug. 2, 2022

(54) IMAGE FORMING APPARATUS

(71) Applicant: KYOCERA Document Solutions Inc., Osaka (JP)

(72) Inventor: Kosuke Nakajima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/256,069

(22) PCT Filed: Jun. 21, 2019

(86) PCT No.: PCT/JP2019/024783
§ 371 (c)(1),
(2) Date: Dec. 24, 2020

(87) PCT Pub. No.: WO2020/004279
PCT Pub. Date: Jan. 2, 2020

(65) Prior Publication Data
US 2021/0152710 A1    May 20, 2021

(30) Foreign Application Priority Data
Jun. 29, 2018 (JP) .............................. JP2018-124887

(51) Int. Cl.
*G06F 15/00* (2006.01)
*H04N 1/34* (2006.01)
*H04N 1/00* (2006.01)

(52) U.S. Cl.
CPC ......... *H04N 1/346* (2013.01); *H04N 1/00424* (2013.01); *H04N 1/00477* (2013.01); *H04N 1/344* (2013.01)

(58) Field of Classification Search
CPC .... H04N 1/346; H04N 1/344; H04N 1/00424; H04N 1/00477
USPC ....................................................... 358/1.15
See application file for complete search history.

(56) References Cited

U.S. PATENT DOCUMENTS

| | | | | |
|---|---|---|---|---|
| 2005/0275876 | A1* | 12/2005 | McLean ............... | G06F 3/1204 358/1.15 |
| 2010/0030707 | A1* | 2/2010 | Jingu .................... | G06F 3/1253 705/400 |
| 2015/0371292 | A1 | 12/2015 | Akutsu | |

FOREIGN PATENT DOCUMENTS

| | | |
|---|---|---|
| JP | 2002-067451 A | 3/2002 |
| JP | 2002-269293 A | 9/2002 |
| JP | 2004-070708 A | 3/2004 |
| JP | 2010-253911 A | 11/2010 |

(Continued)

*Primary Examiner* — Mark R Milia
(74) *Attorney, Agent, or Firm* — IP Business Solutions, LLC

(57) ABSTRACT

An image forming apparatus includes a printing unit that executes a printing operation to print an image on a recording sheet, a HDD in which first authentication information for identifying a user is stored in advance, an operation device for receiving information inputted, and a control device. The control device causes the printing unit to print, on the recording sheet, a first status page including first information related to a charge arising from execution of the printing operation, when an instruction to print a status page indicating a printing status by the printing unit has been received, and the authentication information received through the operation device and the first authentication information stored in the HDD in advance have been accorded with each other.

6 Claims, 17 Drawing Sheets

(56) References Cited

FOREIGN PATENT DOCUMENTS

JP 2016-005227 A 1/2016

\* cited by examiner

STATUS PAGE · · · · · · · 304

| COUNTER | QUANTITY | UNIT PRICE | AMOUNT |
|---|---|---|---|
| COPY | 897 | ¥1 | ¥897 |
| PRINT | 216 | ¥10 | ¥2160 |
| FAX | 60 | ¥10 | ¥600 |
| TOTAL | 1173 | | ¥3657 |

SHEET SIZE

| A3 | 27 |
|---|---|
| B4 | 0 |
| A4 | 1081 |
| B5 | 0 |
| FOLIO | 0 |
| LEDGER | 54 |

```
------    STATUS PAGE    --------
COUNTER
   COPY         897
   PRINT        216        ~402
   FAX           60
   ─────────────────────
   TOTAL       1173

SHEET SIZE
   A3            27
   B4             0        ~403
   A4          1081
   B5             0
   FOLIO          0
   LEDGER        54
              ⋮
```

Fig.17

```
------   STATUS PAGE   ------
COUNTER
  COPY      897
  PRINT     216
  FAX        60
  ─────────────────
  TOTAL    1173

SHEET SIZE
  A3         27
  B4          0
  A4       1081
  B5          0
  FOLIO       0
  LEDGER     54
     ⋮
```

601 — (status page)
602 — COUNTER section
603 — SHEET SIZE section
604 — QR code

IMAGE FORMING APPARATUS

TECHNICAL FIELD

The present invention relates to an image forming apparatus, and in particular to a technique to print a status page that indicates a use status of the apparatus.

BACKGROUND ART

Various techniques have thus far been developed, to acquire information about an image forming apparatus, such as the number of printed sheets, and the printing charge.

For example, Patent Literature (PTL) 1 discloses a charging system including an apparatus information provider that receives management data including information such as the number of printed sheets from an image forming apparatus, through a personal computer (PC) via the public phone line, and calculates the printing charge based on the number of printed sheets, to output billing data.

PTL 2 discloses an image forming apparatus that outputs a status page for notifying information such as the number of printed sheets.

PTL 3 discloses an apparatus information provider that acquires necessary information from a database, in response to a report making request transmitted from a terminal via a network, and makes out a report indicating details such as the number of copied sheets.

CITATION LIST

Patent Literature

[PTL 1] Japanese Unexamined Patent Application Publication No. 2002-67451
[PTL 2] Japanese Unexamined Patent Application Publication No. 2010-253911
[PTL 3] Japanese Unexamined Patent Application Publication No. 2002-269293

SUMMARY OF INVENTION

Technical Problem

However, when a user wishes to obtain the information regarding the printing charge, from the mentioned image forming apparatus, the user has to either inquire of the charging system about the printing charge, or confirm the number of printed sheets on the status page or the report, and calculate him/herself the printing charge, which is troublesome.

In addition, measures have to be taken to restrict unspecified persons from acquitting the information about the printing charge, from the viewpoint of preventing information leakage.

The present invention has been accomplished in view of the foregoing situation, and provides a technique to exempt the user from the trouble related to the acquisition of the information about the charge arising from the use of the image forming operation, and enhance the security in terms of the prevention of information leakage.

Solution to Problem

In an aspect, the present invention provides an image forming apparatus including an image forming device that executes an image forming operation to form an image on a recording medium, a storage device in which first authentication information for identifying a user is stored in advance, an input device through which authentication information is inputted, and a control device. The control device causes the image forming device to form, on the recording medium, a first status page including first information related to a charge arising from execution of the image forming operation, when an instruction to form a status page indicating an image forming status by the image forming device has been received, and the authentication information received through the input device and the first authentication information stored in the storage device in advance have been accorded with each other.

Advantageous Effects of Invention

The mentioned arrangement enables the user to easily acquire the information about the charge arising from the execution of the image forming operation, thereby exempting the user from the trouble of inquiring of the charging system about the charge, or calculating the charge. In addition, it is only the user who owns the authentication information that accords with the first authentication information, that can acquire the first information, and therefore unspecified persons are restricted from acquiring the information about the charge, unlike in the situation where the first information is printed in all the cases where the instruction to form the status page is received. Consequently, the security for the prevention of information leakage can be enhanced.

BRIEF DESCRIPTION OF DRAWINGS

FIG. 9 is a schematic drawing showing an example of a first status page.

FIG. 10 is a schematic drawing showing an example of a second status page.

FIG. 17 is a schematic drawing showing another example of the first status page.

DESCRIPTION OF EMBODIMENTS

First Embodiment

Hereafter, an image forming apparatus 1 according to a first embodiment of the present invention will be described, with reference to the drawings.

Printing System 2

Figure 1:
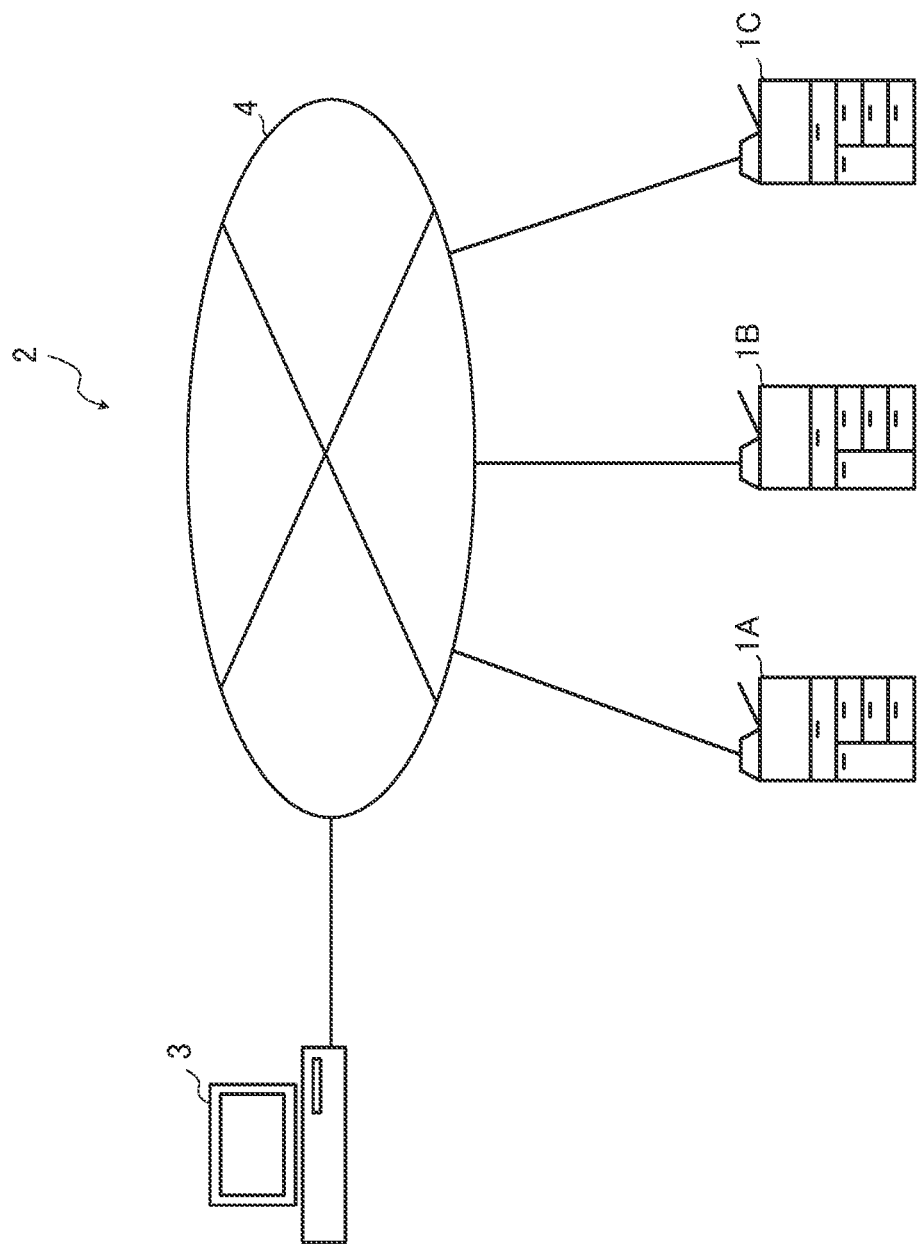
FIG. 1 is a schematic drawing showing a configuration of a printing system including an image forming apparatus according to a first embodiment of the present invention.

FIG. 1 is a schematic drawing showing a configuration of a printing system 2 including the image forming apparatus 1 according to the first embodiment of the present invention. Referring to FIG. 1, the printing system 2 includes image forming apparatuses 1A, 1B, and 1C, and a server apparatus 3. The image forming apparatuses 1A, 1B, and 1C, and the server apparatus 3 are connected to each other via a network 4 such as a local area network (LAN) or the internet, and can perform data communication with each other.

The image forming apparatuses 1A, 1B, and 1C are, for example, installed in each department of a company. The image forming apparatuses 1A, 1B, and 1C are configured to print a status page indicating the current setting detail of the image forming apparatuses 1A, 1B, and 1C, and a status of a printing job being performed by a printing unit 23. The image forming apparatuses 1A, 1B, and 1C can print a first status page, including first information related to a charge arising from execution of a printing operation (hereinafter, "printing charge") by the printing unit 23 to be subsequently described, when the user about to use one of the image forming apparatuses 1A, 1B, and 1C is authenticated through a first authentication to be subsequently described.

The server apparatus 3 is, for example, operated by a service provider of the image forming apparatus 1. The server apparatus 3 manages second information, which is charge information for calculating the printing charge.

Here, the number of image forming apparatuses 1A, 1B, and 1C, and the server apparatus 3 are not limited to the number illustrated in FIG. 1. Hereinafter, the image forming apparatuses 1A, 1B, and 1C may be collectively referred to as image forming apparatus 1.

Image Forming Apparatus 1

The image forming apparatus 1 is a multifunction peripheral having a plurality of functions such as a facsimile function, a copying function, a printing function, and a scanning function.

The image forming apparatus 1 possesses an authentication function, to identify a user permitted to use the image forming apparatus 1. Only the users who own the authentication information that accords with first authentication information, registered in advance in the image forming apparatus 1, are permitted to utilize predetermined functions thereof. In this embodiment, the predetermined functions include the facsimile function, the copying function, and the printing function, for all of which the printing unit 23 performs the printing operation.

The image forming apparatus 1 is configured to print the status page. With the status page printing function, the image forming apparatus 1 can print the status page, indicating the current setting details of the image forming apparatus 1, and the status of a printing job executed by the printing unit 23 to be subsequently described.

Figure 2:
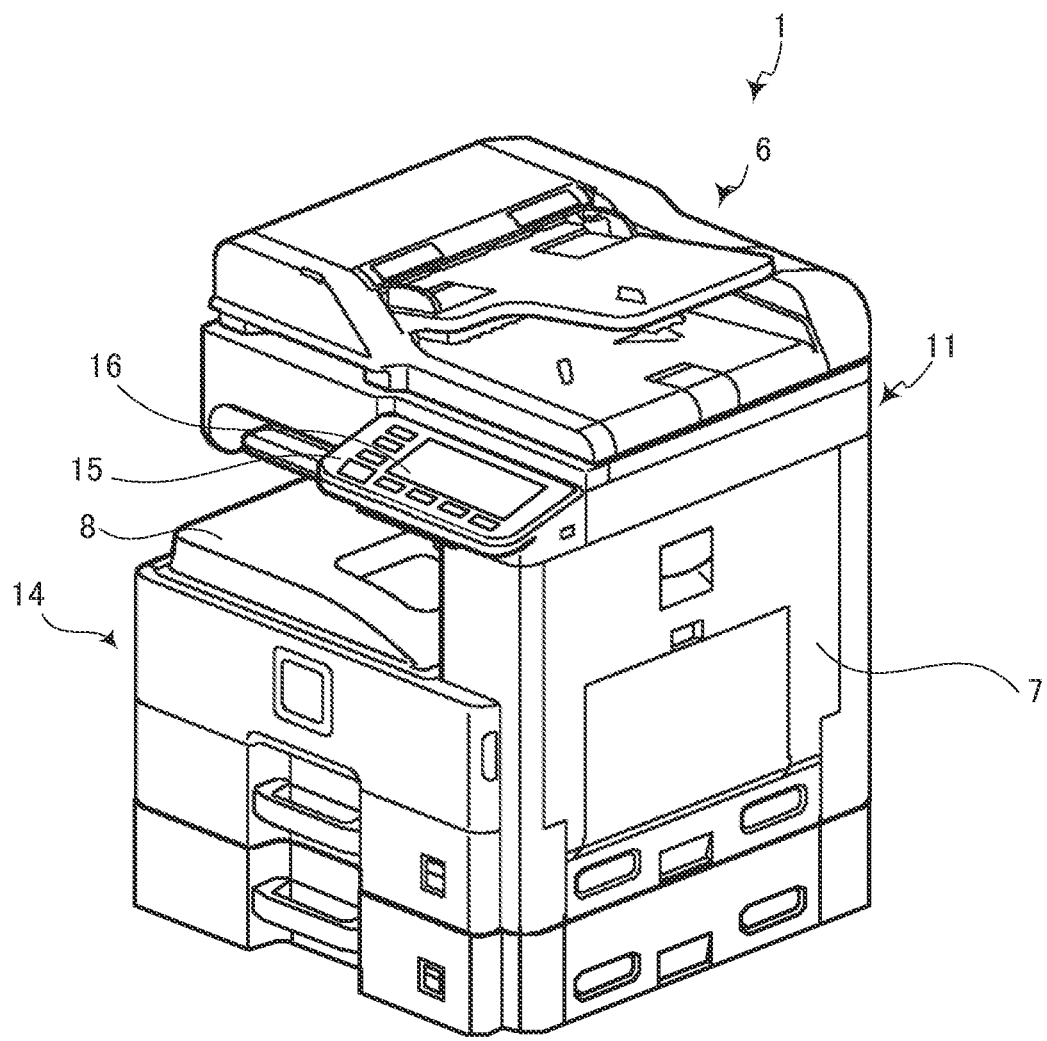
FIG. 2 is a perspective view showing the appearance of the image forming apparatus.

FIG. 2 is a perspective view showing the appearance of the image forming apparatus 1. Referring to FIG. 2, a plurality of components for realizing the functions of the image forming apparatus 1 are accommodated inside a casing 7. Specifically, for example, an image reading device 11, an image forming device 12, a fixing device 13, and a paper feeding device 14 are provided in the casing 7.

The image reading device 11 includes an automatic document feeder (ADF), having a document feeding device 6 that transports a source document, and a scanner that optically reads the source document transported by the document feeding device 7, or placed on a contact glass 8. The image reading device 11 emits light to the source document from a light emitter, and receives the reflected light with a charge-coupled device (CCD) sensor, to thereby read the source document and generate image data.

The image forming device 12 includes a photoconductor drum, a charging device, an exposure device, a developing device, and a transfer device. The image forming device 12 forms a toner image on a recording sheet delivered from the paper feeding device 14, on the basis of the image data acquired by the image reading device 11, or image data transmitted from a personal computer connected via a network 4, other facsimile machines, and so forth.

The fixing device 13 heats and presses the recording sheet on which the toner image has been formed by the image forming device 12, to thereby fix the toner image on the recording sheet. After undergoing the fixing process of the fixing device 13, the recording sheet having the toner image fixed thereon is discharged to an output tray 8. In this embodiment, the formation of the image on the recording sheet through the operation of the image forming device 12 and the fixing device 13 is referred to as "printing".

The paper feeding device 14 draws out one by one the recording sheets stored in the paper cassette, or placed on a manual bypass tray, using a pickup roller, and feeds the recording sheets to the image forming device 12.

The paper feeding device 14 also includes a counter 141 that counts the number of recording sheets delivered from the paper cassette (hereinafter, "number of delivered sheets"). The value indicating the number of delivered sheets is stored in a HDD 19 (not shown in FIG. 2), as counter information.

The image forming apparatus 1 includes an operation device 15, located on the front side and close to the image reading device 11. A user can input, through the operation device 4, instructions. The operation device 15 receives user's inputs of setting or instruction related to the functions that the image forming apparatus 1 is configured to perform, and various types of information. The operation device 15 includes a display device 16 including a touch panel. The display device 16 displays various screens related to the functions that the image forming apparatus 1 is configured to perform. The operation device 15 exemplifies the input device in the present invention.

Figure 3:
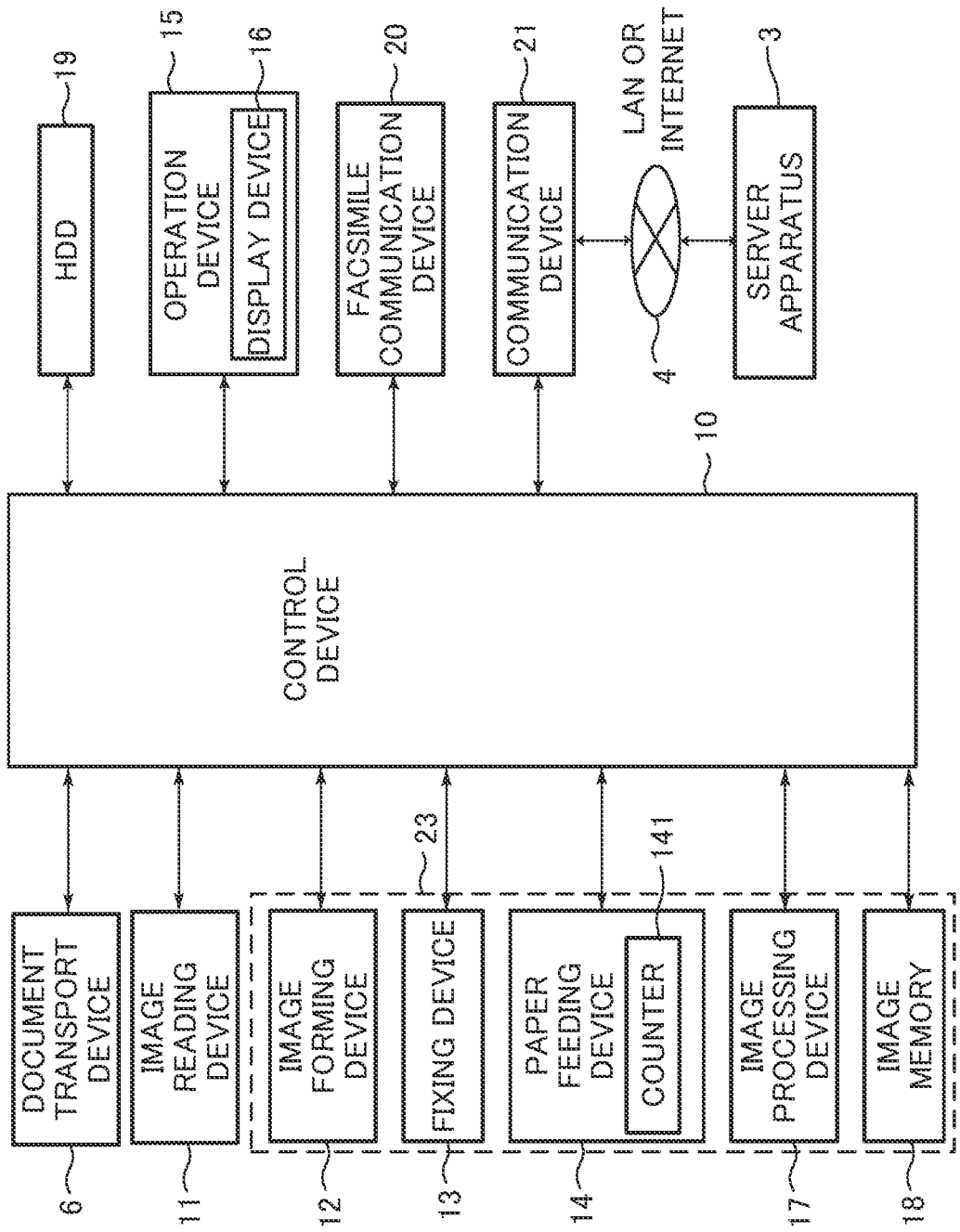
FIG. 3 is a block diagram showing an internal configuration of the image forming apparatus.

FIG. 3 is a block diagram showing an internal configuration of the image forming apparatus 1. Referring to FIG. 3, the image forming apparatus 1 includes a control device 10. The control device 10 includes a processor, a random-access memory (RAM), and a read-only memory (ROM). The processor is, for example, a central processing device (CPU), a micro processing device (MPU), or an application specific integrated circuit (ASIC).

The control device 10 is electrically connected to the document transport device 6, the image reading device 11, the image forming device 12, the fixing device 13, the paper feeding device 14, the operation device 15, an image processing device 17, an image memory 18, a HDD 19, a facsimile communication device 20, and a communication device 21. The image forming device 12, the fixing device 13, the paper feeding device 14, the image processing device 17, and the image memory 18 constitute a printing unit 23 that performs printing operation for printing an image on the recording sheet.

The control device 10 controls the overall operation of the image forming apparatus 1. To be more detailed, the control device 10 controls, by executing various computer programs, the operation of each of the components of the image forming apparatus 1, and also the communication with an external device connected via a network, such as the server apparatus 3 and a personal computer.

The image processing device 17 performs, as appropriate, image processing with respect to the image data generated by the image reading device 11.

The image memory 18 includes a region for temporarily storing the image data generated by the image reading device 11.

The hard disk drive (HDD) 19 is a large-capacity storage device for storing various types of data, including the image data generated by the image reading device 11. The HDD 19 contains various control programs to be used to realize basic operations of the image forming apparatus 1. The HDD 19 contains a print control program for executing the first status page printing operation according to the first embodiment. The control device 10 realizes the first status page printing operation, by operating according to the print control program. However, the first status page printing operation may be executed by a hardware circuit, instead of being realized according to the computer program.

In the HDD 19, user names and the respective passwords are stored in advance, in association with each other, as the first authentication information for identifying the user. The user can input the first authentication information through the operation device 15, for registration.

The control device 10 performs first authentication, including deciding whether the user name and the password inputted as the authentication information through the operation device 15 accord with the user name and the password stored in advance in the HDD 19 as the first authentication information. The control device 10 permits the log-in in the image forming apparatus 1 and allows the predetermined functions to be utilized, upon deciding, through the first authentication, that the user name and the password inputted as the authentication information accord with the user name and the password stored in advance in the HDD 19 as the first authentication information.

In the HDD 19, accumulation information indicating a cumulative sum of the number of sheets that have been printed (hereinafter, "number of printed sheets") is stored, as information indicating the status of the printing job performed by the printing unit 23. More specifically, the accumulation information indicating the cumulative sum of the number of printed sheets by each of the facsimile function, copying function, and the printing function, and indicating cumulative sum of the number of printed sheets of each sheet size, are stored in the HDD 19. The accumulation information is updated each time the printing operation is executed, according to the counter information outputted from the counter 141. The accumulation information is deleted and reset, by the manager of the image forming apparatus 1, or automatically by the control device 10, when a predetermined condition is satisfied, for example when the printing charge has been paid.

In the first embodiment, the accumulation information indicating the cumulative sum of the number of printed sheets, resulting from the printing operation executed by all the users of the image forming apparatus 1 is stored in the HDD 19, with respect to each function and each sheet size. Further, the accumulation information indicating the cumulative sum of the number of printed sheets, resulting from the printing operation executed by the users who own the authentication information that accords with the first authentication information registered in advance, is stored in the HDD 19, in association with the first authentication information, with respect to each function and each sheet size. Thus, the image forming apparatus 1 manages the number of printed sheets, with respect to each of the first authentication information registered in advance, in other words with respect to each of the users registered in advance.

The facsimile communication device 20 makes connection to the public phone line, to transmit and receive the image data through the public phone line.

The communication device 21 includes a communication module such as a local area network (LAN) board. The image forming apparatus 1 performs data communication through the communication device 21, with an external device on the network 4, such as the server apparatus 3 and a personal computer.

A power source is provided for each of the components in the image forming apparatus 1, so that the components of the image forming apparatus 1 may perform the operation, with the power from the power source.

Server Apparatus 3

Figure 4:
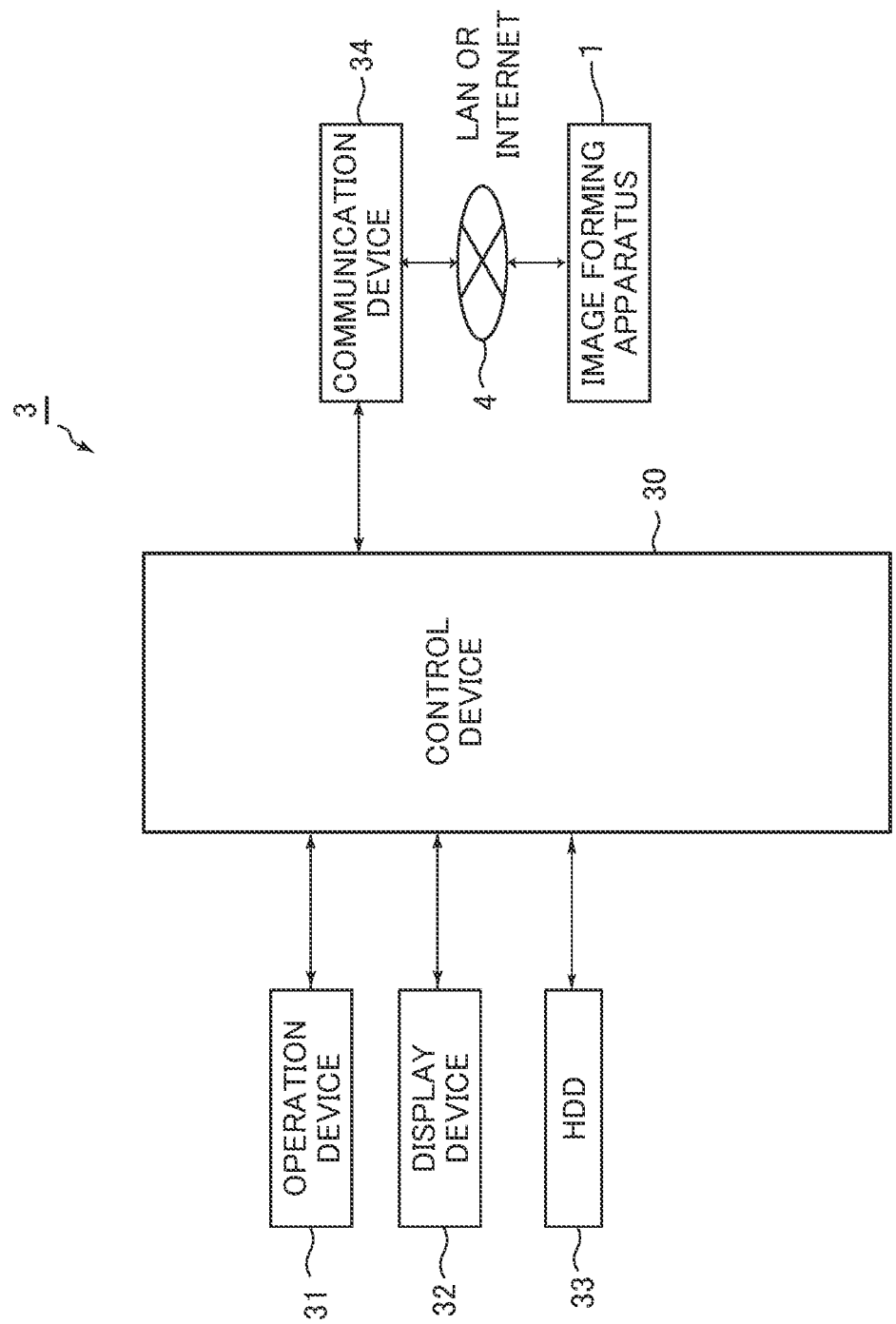
FIG. 4 is a block diagram showing an internal configuration of a server apparatus.

The server apparatus 3 is, for example, constituted of a PC server. FIG. 4 is a block diagram showing an internal configuration of the server apparatus 3. Referring to FIG. 4, the server apparatus 3 includes a control device 30. The control device 30 includes a processor, a RAM, and a ROM. The processor is, for example, a CPU, an MPU, or an ASIC.

The control device 30 is electrically connected to an operation device 31, a display device 32, a HDD 33, and a communication device 34. The control device 30 controls the overall operation of the server apparatus 3. To be more detailed, the control device 30 controls, by executing various computer programs, the operation of each of the components of the server apparatus 3, and also the communication with the image forming apparatus 1 connected via the network 4.

The operation device 31 receives instructions inputted by the user, related to various functions that the server apparatus 3 is configured to perform. The operation device 31 includes a keyboard for inputting characters, and a mouse serving as a pointing device.

The display device 32 includes, for example, an LCD panel. The display device 32 displays a screen showing a result of processing performed by the server apparatus 3.

The HDD 33 contains various computer programs to be used to realize basic operations of the server apparatus 3. The HDD 33 contains a transmission control program for executing first information transmission according to the first embodiment. The control device 30 realizes the first information transmission, by operating according to the transmission control program. However, the first information transmission may be executed by a hardware circuit, instead of being realized according to the computer program.

HDD 33 contains the second information in advance, as charge information for calculating the printing charge. The second information includes information indicating a unit price for printing one recording sheet, specified with respect to each of the facsimile function, the copying function, and the printing function. For example, for the facsimile function, the unit price for printing one recording sheet is set to "10 yen". For the copying function, the unit price for printing one recording sheet is set to "1 yen". For the printing function, the unit price for printing one recording sheet is set to "10 yen".

The second information is specified as desired, for example by the service provider of the image forming apparatus 1. In the first embodiment, the second information is stored in the HDD 33, in association with the user name and the password stored as the first authentication information. Accordingly, the server apparatus 3 manages the second information, with respect to each of the first authentication information registered in advance, in other words with respect to each of the users registered in advance.

The control device 10 calculates the printing charge for each function, by multiplying the unit price for each of the facsimile function, copying function, and the printing function, by the cumulative sum of the number of printed sheets of the corresponding function. For example, when the cumulative sum of the number of printed sheets of the facsimile function is 60 sheets, the printing charge for the facsimile function is 600 yen, according to the following equation (1).

$$10(\text{yen}) \times 60 \text{ (sheets)} = 600 \text{ (yen)} \quad (1)$$

The communication device 34 includes a communication module such as a LAN board. The server apparatus 3 performs data communication with an external device, such as the image forming apparatus 1 on the network 4, through the communication device 34.

A power source is provided for each of the components in the server apparatus 3, so that the components of the server apparatus 3 may perform the operation, with the power from the power source.

Operation

Hereunder, a control procedure based on the print control program, executed by the image forming apparatus 1 to perform the first status page printing operation, will be described, along with the operation of the image forming apparatus 1. In addition, a control procedure based on the transmission control program, executed by the server apparatus 3 to perform the first information transmission, will be described hereunder, along with the operation of the server apparatus 3.

Figure 5:
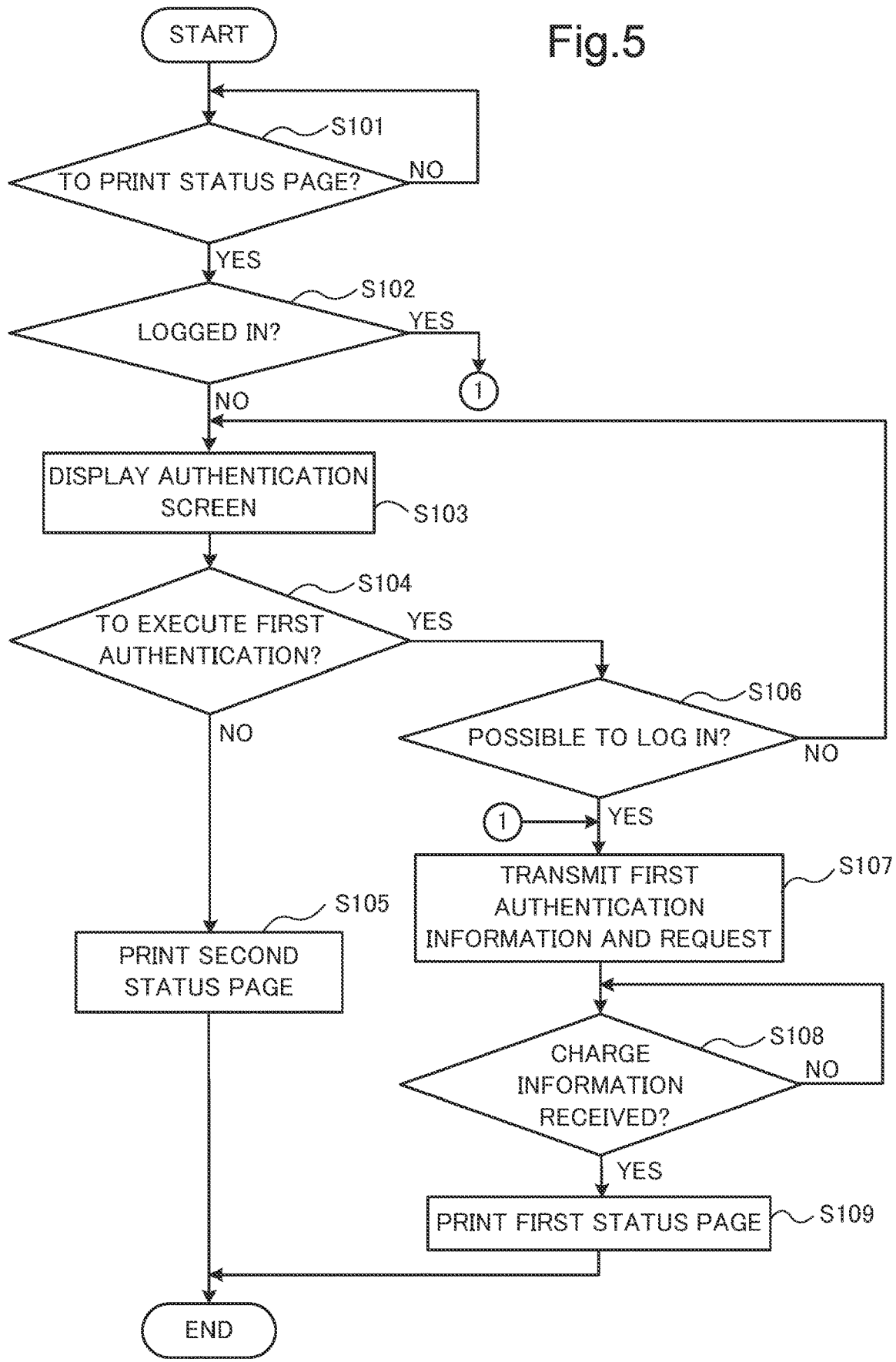
FIG. 5 is a flowchart showing a first status page printing process.
Figure 6:
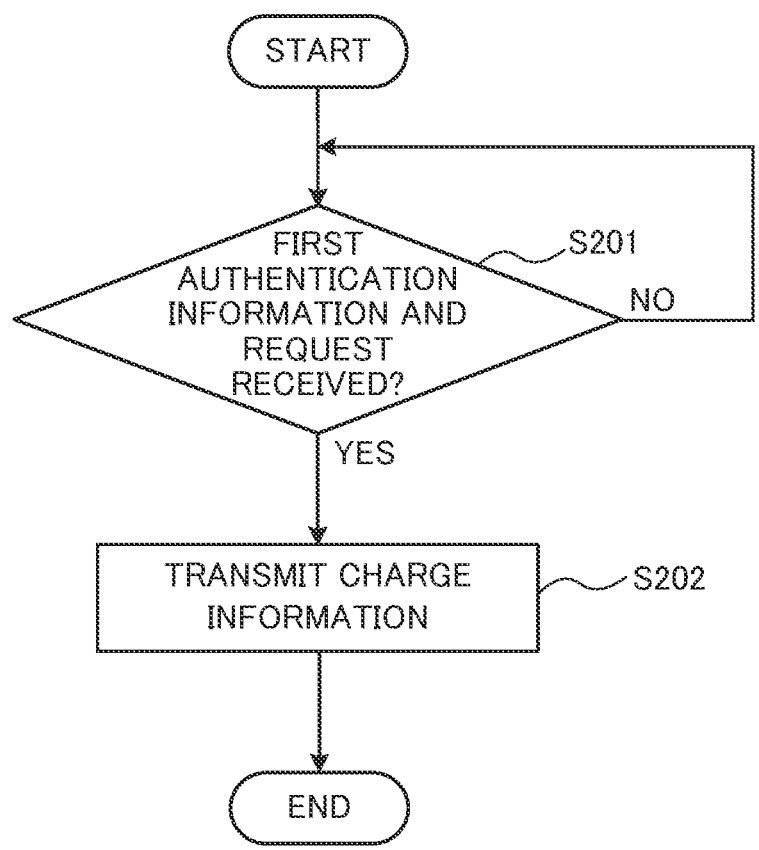
FIG. 6 is a flowchart showing a first information transmission process.

The print control program for executing the first status page printing operation is activated when the power to the image forming apparatus 1 is turned on. The transmission control program for executing the first information transmission is activated when the power to the server apparatus 3 is turned on. FIG. 5 is a flowchart showing the first status page printing process. FIG. 6 is a flowchart showing the first information transmission process. In the following description, it will be assumed that the power to the server apparatus 3 is turned on.

Figure 7:
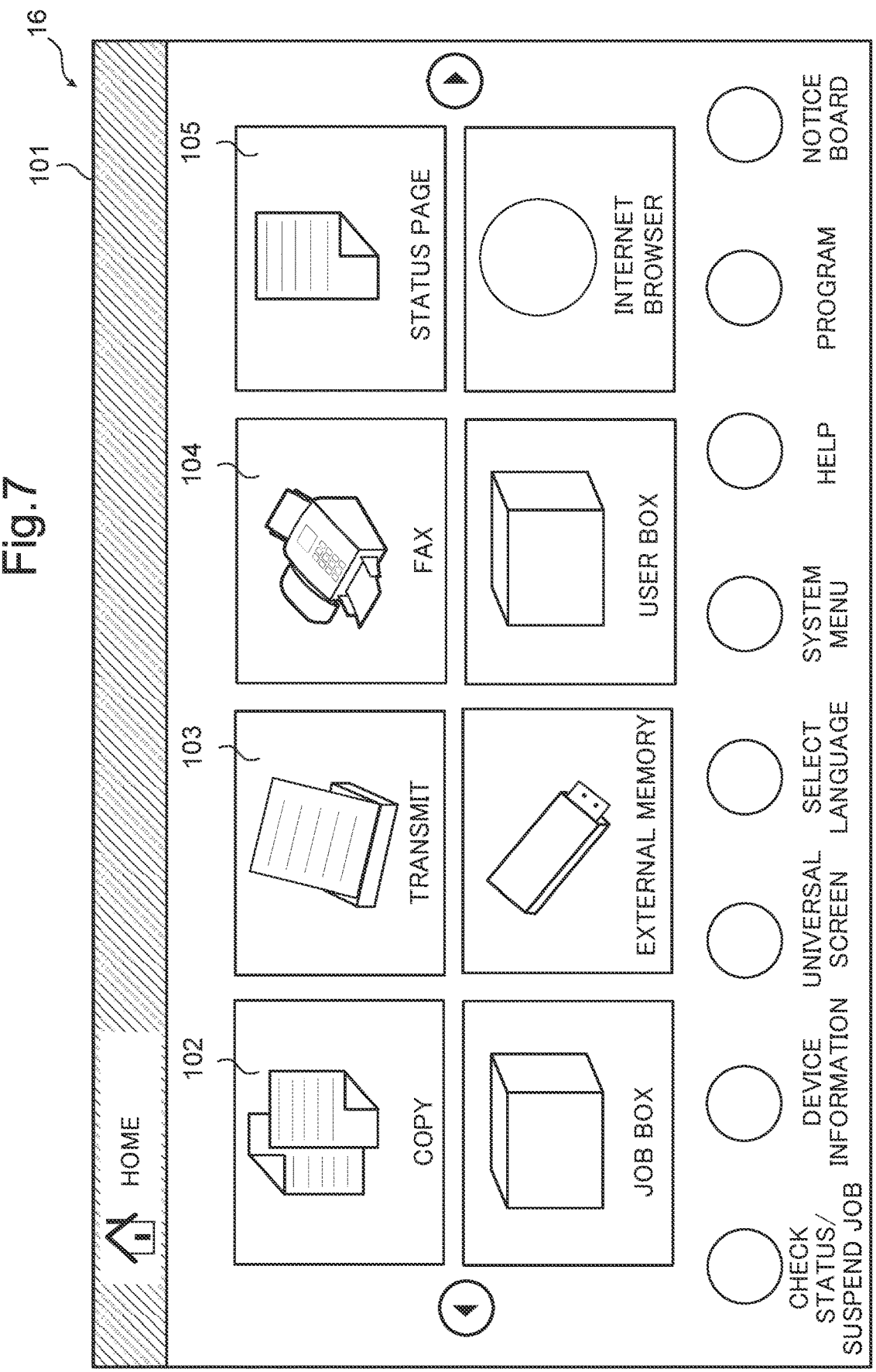
FIG. 7 is a schematic drawing showing an example of a home screen.

When the power to the image forming apparatus 1 is turned on, the control device 10 causes the display device 16 to display a home screen 101. FIG. 7 illustrates an example of the home screen 101. Referring to FIG. 7, the home screen 101 is used to select one of the plurality of functions that the image forming apparatus 1 is configured to perform. For example, the home screen 101 includes a key 102 for selecting the copying function, a key 103 for selecting the scanning function, and a key 104 for selecting the facsimile function, which are soft keys. The home screen 101 also includes a key 105 for selecting the status page printing function, and instructing to print the status page.

Referring to FIG. 5, when the user of the image forming apparatus 1 presses the key 105 with an intention to print the status page, the control device 10 decides that the instruction to print the status page has been received (YES at step S101), and decides whether the user has logged in (step S102).

(1) When First Authentication is Not Yet Done

In the case where the first authentication has not been done before the instruction to print the status page is inputted in the image forming apparatus 1, the control device 10 decides that the user has not logged in (NO at step S102), and causes the display device 16 to display an authentication screen 201, for the user to input the authentication information (step S103).

Figure 8:
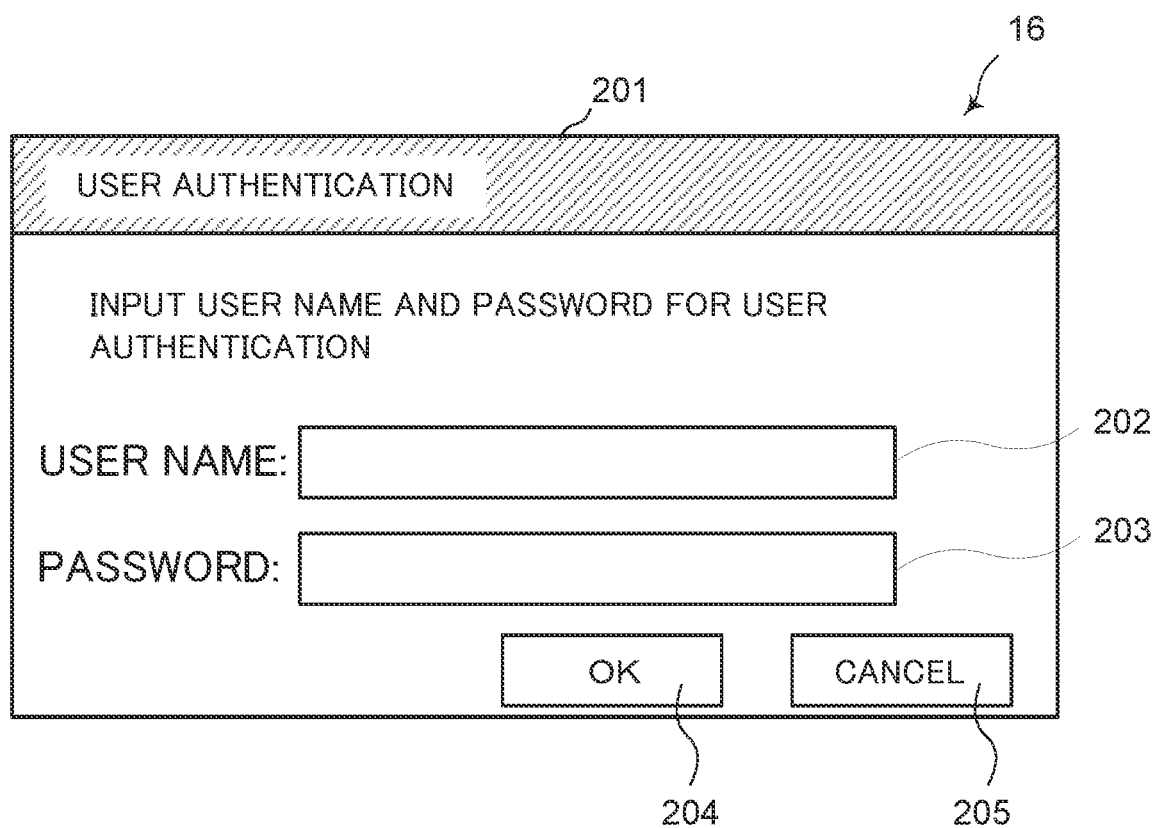
FIG. 8 is a schematic drawing showing an example of an authentication screen.

FIG. 8 illustrates an example of the authentication screen 201. Referring to FIG. 8, the authentication screen 201 includes a field 202 for inputting the user name, and a field 203 for inputting the password. The authentication screen 201 also includes a key 204 for instructing the execution of the first authentication, and a key 205 for cancelling the first authentication, which are soft keys.

(1-1) When User Owns Authentication Information According with First Authentication Information When the user who owns the user name and the password that accord with the first authentication information inputs the user name in the field 202 and the password in the field 203, and then presses the key 204, on the operation device 15, the control device 10 decides that the instruction to execute the first authentication has been received (YES at step S104).

When the user name and the password inputted as the authentication information discord with the user name and the password stored in advance in the HDD 19 as the first authentication information, because of an input error of the user, the control device 10 decides that the user is not permitted to log in (NO at step S106), and causes the display device 16 to again display the authentication screen 201 (step S103).

The user again inputs, through the operation device 15, the user name in the field 202 and the password in the field 203, and presses the key 204. When the key 204 is pressed, the control device 10 decides that the instruction to execute the first authentication has been received (YES at step S104).

When the user name and the password inputted again by the user as the authentication information accord with the user name and the password stored in advance in the HDD 19 as the first authentication information, the control device 10 decides that the user may log in (YES at step S106). Then the control device 10 transmits the first authentication information, which accords with the user name and the password inputted as the authentication information, to the server apparatus 3 through the communication device 21, and requests the server apparatus 3 to transmit the second information, as the charge information corresponding to the first authentication information transmitted (step S107).

Referring to FIG. 6, the control device 30 of the server apparatus 3 decides, upon receipt of the first authentication information and the request from the image forming apparatus 1 through the communication device 34, that the first authentication information and the request have been received (YES at step S201), and reads out the second information corresponding to the first authentication information received, from the HDD 33. Then the control device 30 transmits the second information that has been read out, to the image forming apparatus 1 as the charge information, through the communication device 34 (step S202).

Referring to FIG. 5, upon receipt of the second information from the server apparatus 3 through the communication device 21, the control device 10 of the image forming apparatus 1 decides that the second information has been received from the server apparatus 3 as the charge information (YES at step S108). Then the control device 10 generates a first status page 301 including the first information about the printing charge, on the basis of the accumulation information and the second information stored in the HDD 19, and causes the printing unit 23 to print the first status page 301 generated, on the recording sheet (step S109).

FIG. 9 illustrates an example of the first status page 301. Referring to FIG. 9, the control device 10 generates the first status page 301, so as to include accumulation information 302 indicating the cumulative sum of the number of printed sheets, with respect to each of the copying function, the printing function, and the facsimile function, and accumulation information 303 indicating the cumulative sum of the number of printed sheets, with respect to each sheet size. The accumulation information 302 and the accumulation information 303 are stored in the HDD 19. The accumulation information 302 and the accumulation information 303 indicate the data based on the printing operation thus far performed by the authenticated user.

The control device 10 generates the first status page 301, so as to also include first information 304 corresponding to the authenticated user. The first information 304 is based on the second information received from the server apparatus 3, and includes the information indicating the unit price for printing one recording sheet, specified for each of the copying function, the printing function, and the facsimile function, the information indicating the printing charge calculated with respect to each of the copying function, the printing function, and the facsimile function, and the information indicating the total amount of the printing charge.

The control device 10 calculates the printing charge and the total amount of the printing charge included in the first information 304, on the basis of the second information and the accumulation information 302 that have been received.

(1-2) When User is without Authentication Information According with First Authentication Information When the user who does not own the user name and the password that accord with the first authentication information presses the key 205 of the authentication screen 201, the control device 10 decides that the execution of the first authentication has been restricted (NO at step S104). Then the control device 10 generates a second status page 401 that does not include the first information about the printing charge, on the basis of the accumulation information stored in the HDD 19, and causes the printing unit 23 to print the second status page 401 generated, on the recording sheet (step S105).

FIG. 10 illustrates an example of the second status page 401. Referring to FIG. 10, the control device 10 generates the second status page 401, so as to include accumulation information 402 indicating the cumulative sum of the number of printed sheets, with respect to each of the copying function, the printing function, and the facsimile function, and accumulation information 403 indicating the cumulative sum of the number of printed sheets, with respect to each sheet size. The accumulation information 402 and the accumulation information 403 are stored in the HDD 19. The accumulation information 402 and the accumulation information 403 indicate the data based on the printing operation thus far performed by all the users of the image forming apparatus 1.

(2) When First Authentication is Already Done

It is assumed here that the user of the image forming apparatus 1 completed the first authentication process before inputting the instruction to print the status page, and that the image forming apparatus 1 has just finished the printing by the copying function. Accordingly, the control device 10 decides that the user has logged in (YES at step S102), and transmits the first authentication information to the server apparatus 3 through the communication device 21. The control device 10 also requests the server apparatus 3 to transmit the second information, as the charge information corresponding to the first authentication information transmitted (step S107).

Referring to FIG. 6, the control device 30 of the server apparatus 3 decides, upon receipt of the first authentication information and the request from the image forming apparatus 1 through the communication device 34, that the first authentication information and request have been received (YES at step S201), and reads out the second information corresponding to the first authentication information received, from the HDD 33. Then the control device 30 transmits the second information that has been read out, to the image forming apparatus 1 as the charge information, through the communication device 34 (step S202).

Referring to FIG. 5, upon receipt of the second information from the server apparatus 3 through the communication device 21, the control device 10 of the image forming apparatus 1 decides that the second information has been received from the server apparatus 3 as the charge information (YES at step S108). Then the control device 10 generates a first status page 301 including the first information about the printing charge, on the basis of the accumulation information and the second information stored in the HDD 19, and causes the printing unit 23 to print the first status page 301 generated, on the recording sheet (step S109).

Second Embodiment

The configuration of the printing system 2, including the image forming apparatus 1 and the server apparatus 3 according to a second embodiment of the present invention, is the same as that of the printing system 2 according to the first embodiment, except for the following aspects.

Image Forming Apparatus 1

The image forming apparatus 1 possesses a department management function, to manage the use of the image forming apparatus 1 with respect to each department.

The HDD 19 of the image forming apparatus 1 contains a print control program for executing a second status page printing operation according to the second embodiment, in place of the print control program for executing the first status page printing operation. The control device 10 realizes the second status page printing operation, by operating according to the print control program. However, the second status page printing operation may be executed by a hardware circuit, instead of being realized according to the computer program.

Department names and the corresponding department codes are stored in advance in the HDD 19, as department information for identifying the department to which the user belongs, in association with the first authentication information. The user can input the department information through the operation device 15, for registration.

The accumulation information indicating the cumulative sum of the number of printed sheets, resulting from all the printing operations executed by the image forming apparatus 1 is stored in the HDD 19, with respect to each function and each sheet size. Further, the cumulative sum of the number of printed sheets, resulting from the printing operation executed by the user who belongs to the department, the department information of which is registered in advance, is stored in the HDD 19, in association with the department information, with respect to each function and each sheet size. Thus, the image forming apparatus 1 manages the number of printed sheets, with respect to each of the departments, the department information of which is registered in advance.

Server Apparatus 3

The HDD 33 of the server apparatus 3 contains a transmission control program for executing second information transmission according to the second embodiment, in place of the transmission control program for executing the first information transmission. The control device 30 realizes the second information transmission, by operating according to the transmission control program. However, the second information transmission may be executed by a hardware circuit, instead of being realized according to the computer program.

In the HDD 33, the second information is stored as the charge information for calculating the printing charge, in association with the department information, including the department names and the corresponding department codes. Accordingly, the server apparatus 3 manages the second information, with respect to each of the departments, the department information of which is registered in advance.

Operation

Hereunder, a control procedure based on the print control program, executed by the image forming apparatus 1 to perform the second status page printing operation, will be described, along with the operation of the image forming apparatus 1. In addition, a control procedure based on the transmission control program, executed by the server apparatus 3 to perform the second information transmission, will be described hereunder, along with the operation of the server apparatus 3.

Figure 11:
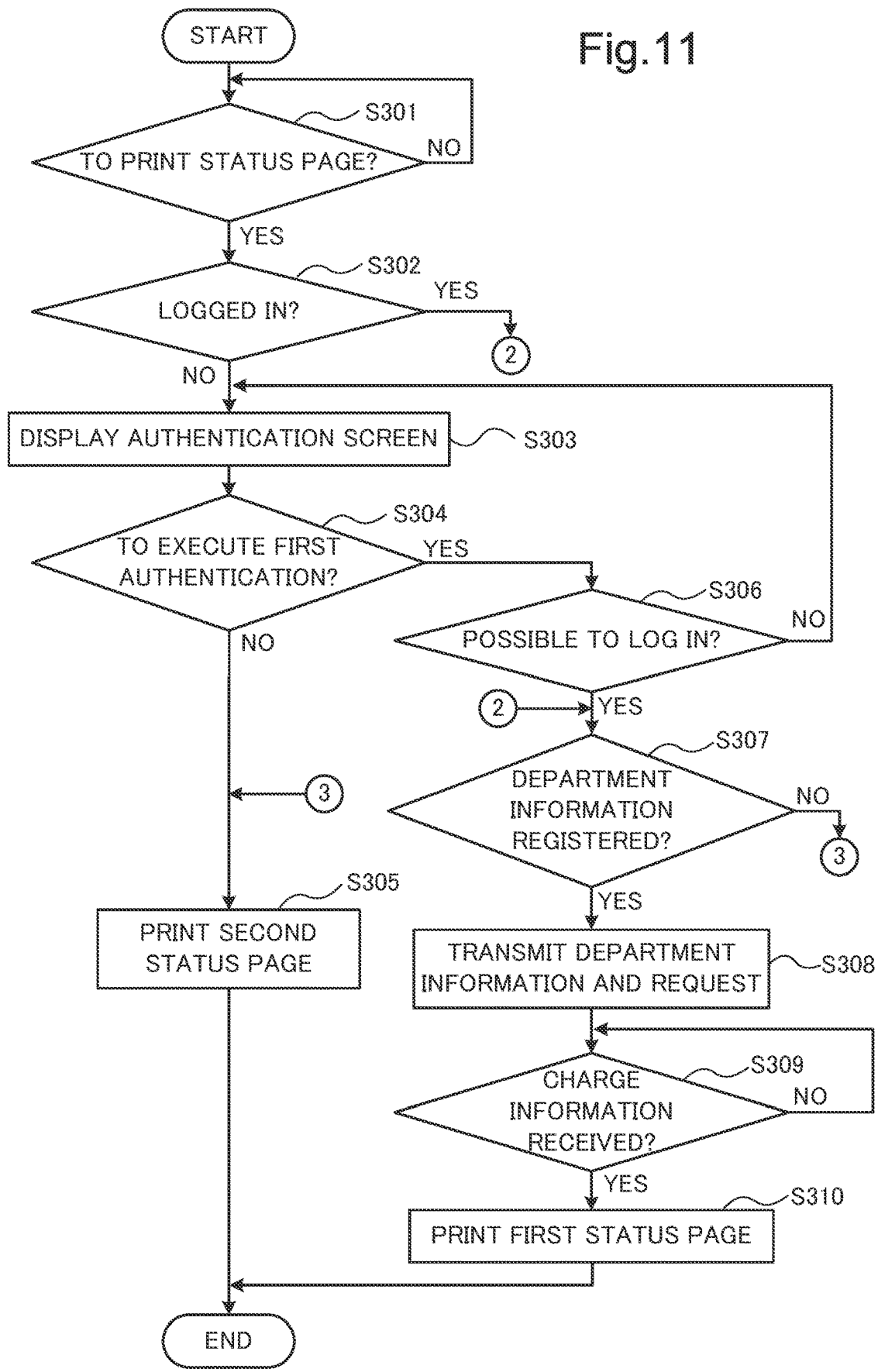
FIG. 11 is a flowchart showing second status page printing process.
Figure 12:
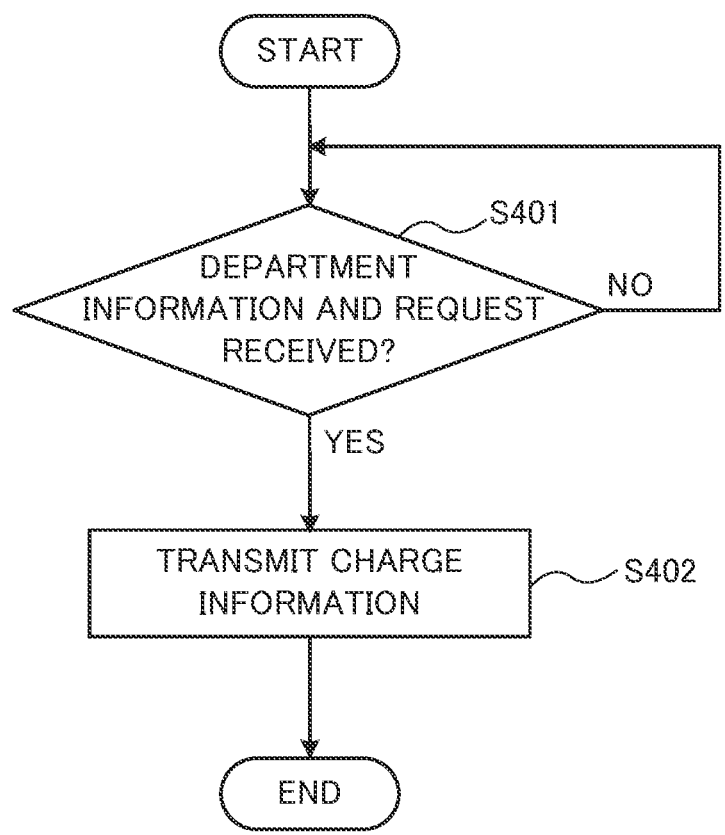
FIG. 12 is a flowchart showing a second information transmission process.

The print control program for executing the second status page printing operation is activated when the power to the image forming apparatus 1 is turned on. The transmission control program for executing the second information transmission is activated when the power to the server apparatus 3 is turned on. FIG. 11 is a flowchart showing the second status page printing process. FIG. 12 is a flowchart showing the second information transmission process. In the following description, it will be assumed that the power to the image forming apparatus 1 and the power to the server apparatus 3 are turned on.

Referring to FIG. 11, operations of step S301 to step S305 in the second status page printing operation are the same as those of step S101 to step S105 in the first status page printing operation shown in FIG. 5. Hereafter, in the operation of the image forming apparatus 1 according to the second embodiment, the same part as that of the first embodiment will not be described in duplication.

(1) When First Authentication is Not Yet Done

Referring to FIG. 11, after the control device 10 performs the operation of step S301 to step S303, in the same way as step S101 to step S103 shown in FIG. 5, the user inputs, through the operation device 15, the user name in the field 202 and the password in the field 203, and then presses the key 204, on the authentication screen 201. When the key 204 is pressed, the control device 10 decides that the instruction to execute the first authentication has been received (YES at step S304).

When the user name and the password inputted as the authentication information accord with the user name and the password stored in advance in the HDD 19 as the first authentication information, the control device 10 decides that the user may log in (YES at step S306).

(1-1) When Affiliated Department is Registered

When the department information, associated with the first authentication information that accords with the user name and the password inputted through the operation device 15, is stored in the HDD 19, the control device 10 decides that the department to which the authenticated user belongs is registered (YES at step S307). Then the control device 10 transmits the department information, associated with the first authentication information that accords with the user name and the password inputted through the operation device 15, to the server apparatus 3 through the communication device 21, and requests the server apparatus 3 to transmit the second information, as the charge information corresponding to the department information transmitted (step S308).

Referring to FIG. 12, the control device 30 of the server apparatus 3 decides, upon receipt of the department information and the request from the image forming apparatus 1 through the communication device 34, that the department information and the request have been received (YES at step S401), and reads out the second information corresponding to the department information received, from the HDD 33. Then the control device 30 transmits the second information that has been read out, to the image forming apparatus 1 as the charge information, through the communication device 34 (step S402).

Referring to FIG. 11, upon receipt of the second information from the server apparatus 3 through the communication device 21, the control device 10 of the image forming apparatus 1 decides that the second information has been received from the server apparatus 3 as the charge information (YES at step S309). Then the control device 10 generates the first status page 301 including the first information 304 about the printing charge, on the basis of the accumulation information and the second information stored in the HDD 19, and causes the printing unit 23 to print the first status page 301 generated, on the recording sheet (step S310).

In the second embodiment, the accumulation information 302 and the accumulation information 303 in the first status page 301 shown in FIG. 9 indicate the data based on the printing operation thus far performed by the user who belongs to the department identified by the department information associated with the authentication information inputted. In the first status page 301, the first information 304 is based on the second information and the accumulation information 302, received from the server apparatus 3, and corresponding to the department information associated with the authentication information inputted.

(1-2) When Affiliated Department is Not Registered

When the department information, associated with the first authentication information that accords with the user name and the password inputted, is not stored in the HDD 19, the control device 10 decides that the department to which the authenticated user belongs is not registered (NO at step S307). Then the control device 10 generates the second status page 401 that does not include the first information 304 about the printing charge, on the basis of the accumulation information stored in the HDD 19, and causes the printing unit 23 to print the second status page 401 generated, on the recording sheet (step S305).

(2) When First Authentication is Already Done

It is assumed here that the user of the image forming apparatus 1 completed the first authentication process before inputting the instruction to print the status page, and that the image forming apparatus 1 has just finished the printing by the copying function. Referring to FIG. 11, the control device 10 performs the operation of step S301 in the same way as step S101 shown in FIG. 5, and then decides that the user has logged in (YES at step S302). Then the control device 10 performs the operation of step S307 to step S310, or step S307 and step S305, as described above.

Third Embodiment

The configuration of the printing system 2, including an image forming apparatus 1A and the server apparatus 3 according to a third embodiment of the present invention, is the same as that of the printing system 2 according to the first embodiment, except for the following aspects.

Image Forming Apparatus 1A

In the third embodiment, the manager of the image forming apparatus 1A can instruct in advance, through the operation device 15, whether to include the first information about the printing charge in the status page.

The HDD 19 of the image forming apparatus 1A contains a print control program for executing a third status page printing operation according to the third embodiment, in place of the print control program for executing the first status page printing operation. The control device 10 realizes the third status page printing operation, by operating according to the print control program. However, the third status page printing operation may be executed by a hardware circuit, instead of being realized according to the computer program.

In the HDD 19, a manager name and the corresponding password are stored in advance, in association with each other, as second authentication information for identifying the authorized manager. The manager can input the second authentication information through the operation device 15, for registration.

The control device 10 executes the second authentication, including deciding whether the manager name and the password inputted through the operation device 15 as the authentication information accord with the manager name and the password stored in advance in the HDD 19 as the second authentication information. Upon deciding in the second authentication that the manager name and the password inputted as the authentication information accord with the manager name and the password stored in advance in the HDD 19 as the second authentication information, the control device 10 allows the selection whether to include the first information in the status page to be inputted.

In the HDD 19, identification information for identifying the image forming apparatus 1A is stored in advance. The identification information is registered in advance, for example by the service provider of the image forming apparatus 1A, at the time that the image forming apparatus 1A is manufactured. The identification information is not specifically limited and, for example, the apparatus ID, or the serial number may be registered.

Server Apparatus 3

The HDD 33 of the server apparatus 3 contains a transmission control program for executing third information transmission according to the third embodiment, in place of the transmission control program for executing the first information transmission. The control device 30 realizes the third information transmission, by operating according to the transmission control program. However, the third information transmission may be executed by a hardware circuit, instead of being realized according to the computer program.

In the HDD 33, the second information is also stored in association with the identification information for identifying the image forming apparatus 1. Accordingly, the server apparatus 3 manages the second information, with respect to each of the image forming apparatuses 1A, 1B, and 1C connected via the network 4.

Operation

Hereunder, a control procedure based on the print control program, executed by the image forming apparatus 1A to perform the third status page printing operation, will be described, along with the operation of the image forming apparatus 1A. In addition, a control procedure based on the transmission control program, executed by the server apparatus 3 to perform the third information transmission, will be described hereunder, along with the operation of the server apparatus 3.

Figure 13:
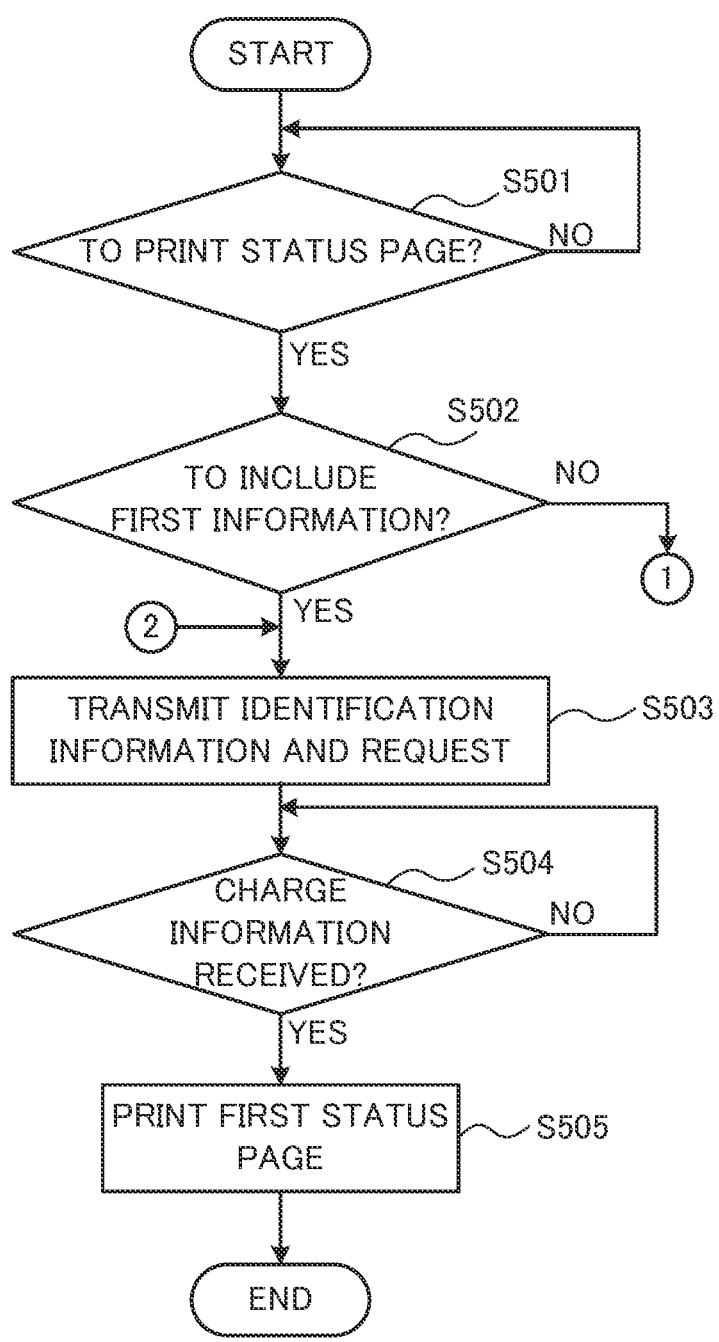
FIG. 13 is a flowchart showing a third status page printing process.
Figure 14:
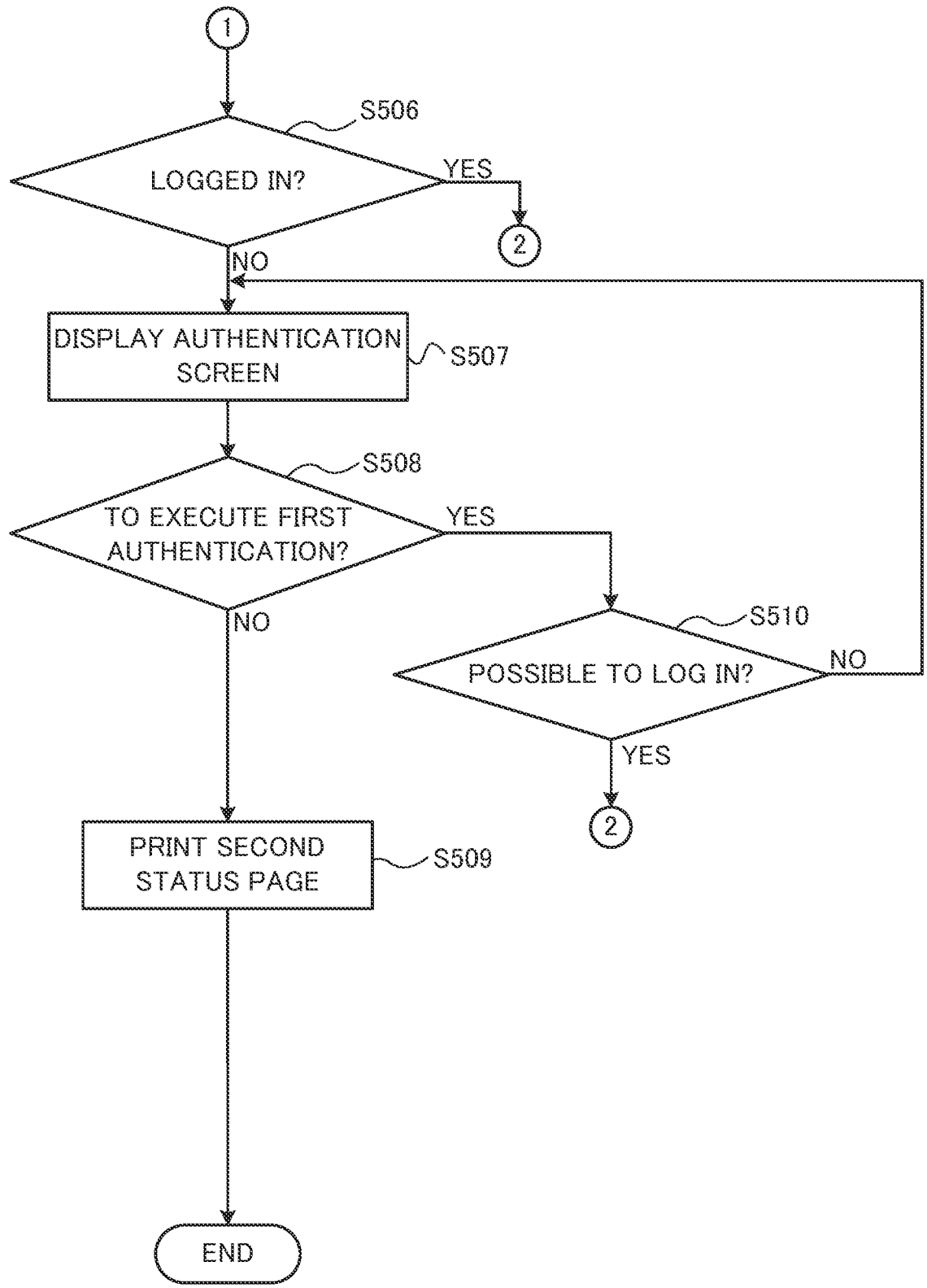
FIG. 14 is a flowchart showing the third status page printing process.
Figure 15:
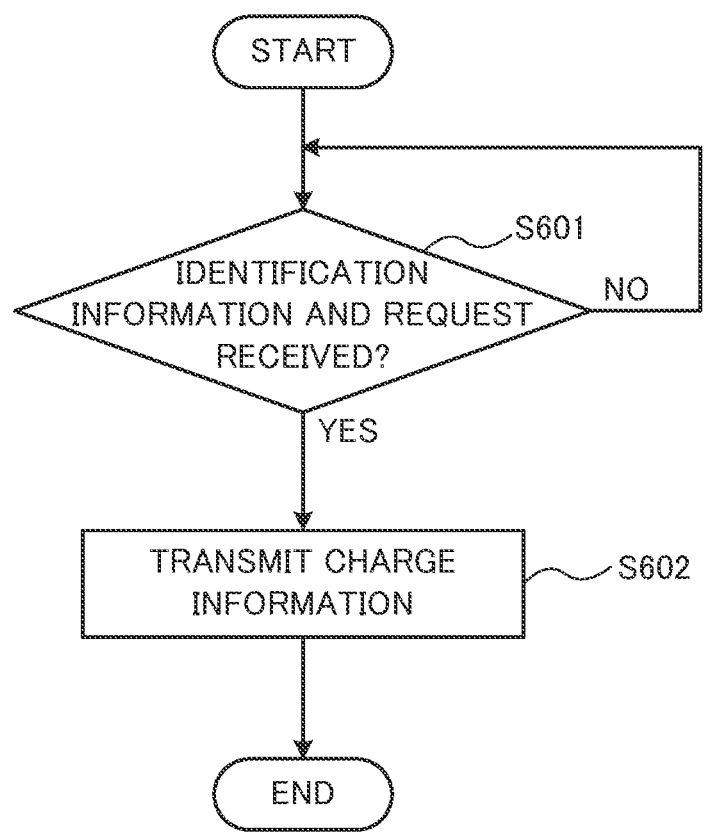
FIG. 15 is a flowchart showing a third information transmission process.

The print control program for executing the third status page printing operation is activated when the power to the image forming apparatus 1A is turned on. The transmission control program for executing the third information transmission is activated when the power to the server apparatus 3 is turned on. FIG. 13 and FIG. 14 are flowcharts showing the third status page printing process. FIG. 15 is a flowchart showing the third information transmission process. In the following description, it will be assumed that the power to the image forming apparatus 1A and the power to the server apparatus 3 are turned on.

The manager of the image forming apparatus 1A inputs the manager name and the password as the authentication information, through the operation device 15, to perform the second authentication.

When the manager name and the password inputted by the manager as the authentication information accord with the manager name and the password stored in advance in the HDD 19 as the second authentication information, the control device 10 causes the display device 16 to display a selection screen for selecting whether the first information about the printing charge is to be included in the status page.

Figure 16:
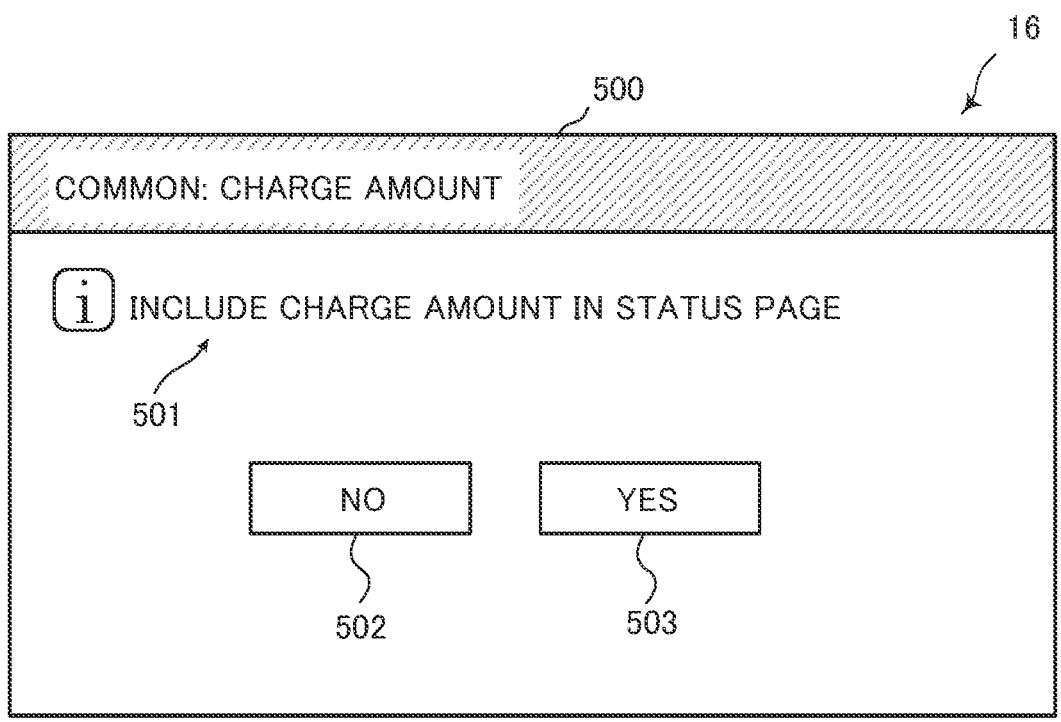
FIG. 16 is a schematic drawing showing an example of a selection screen.

FIG. 16 illustrates an example of the selection screen 500. Referring to FIG. 16, the selection screen 500 includes a message 501 saying as "Include charge amount in status page". The selection screen 500 also includes a key 503 for allowing the first information to be included in the status page, and a key 502 for restricting the first information from being included in the status page, which are soft keys.

(1) When First Information is to be Included in Status Page

The manager of the image forming apparatus 1A presses the key 503 on the selection screen 500. Upon detecting that the key 503 has been pressed, the control device 10 sets the first information so as to be included in the status page.

Referring to FIG. 13, when the user of the image forming apparatus 1A presses the key 105 on the home screen 101, with the intention to print the status page, the control device 10 decides that the instruction to print the status page has been received (YES at step S501), and also decides that the first information is allowed to be included in the status page (YES at step S502). Then the control device 10 transmits the identification information of the image forming apparatus 1A, stored in the HDD 19, to the server apparatus 3 through the communication device 21, and also requests the server apparatus 3 to transmit the second information as the charge information corresponding to the identification information transmitted (step S503).

Referring to FIG. 15, the control device 30 of the server apparatus 3 decides, upon receipt of the identification information and the request from the image forming apparatus 1A through the communication device 34, that the identification information and request have been received (YES at step S601), and reads out the second information corresponding to the identification information received, from the HDD 33. Then the control device 30 transmits the second information that has been read out, to the image forming apparatus 1A as the charge information, through the communication device 34 (step S602).

Referring to FIG. 13, upon receipt of the second information from the server apparatus 3 through the communication device 21, the control device 10 of the image forming apparatus 1A decides that the second information has been received from the server apparatus 3 as the charge information (YES at step S504). Then the control device 10 generates the first status page 301 including the first information 304 about the printing charge, on the basis of the accumulation information and the second information stored in the HDD 19, and causes the printing unit 23 to print the first status page 301 generated, on the recording sheet (step S505).

In the third embodiment, the accumulation information 302 and the accumulation information 303 in the first status page 301 shown in FIG. 9 indicate the data based on the printing operation thus far performed by all the users of the image forming apparatus 1A. In the first status page 301, the first information 304 is based on the second information and the accumulation information 302 related to the image forming apparatus 1A, received from the server apparatus 3.

(2) When First Information is Not to be Included in Status Page

The manager of the image forming apparatus 1A presses the key 502 on the selection screen 500. Upon detecting that the key 502 has been pressed, the control device 10 sets the first information so as not to be included in the status page.

Referring to FIG. 13, when the user of the image forming apparatus 1A presses the key 105 on the home screen 101, with the intention to print the status page, the control device 10 decides that the instruction to print the status page has been received (YES at step S501), and also decides that the first information is restricted from being included in the status page (NO at step S502).

(2-1) When First Authentication is Not Yet Done

Referring to FIG. 14, operations of step S506 to step S509 in the third status page printing operation are the same as those of step S102 to step S105 in the first status page printing operation shown in FIG. 5. Hereafter, in the operation of the image forming apparatus 1A according to the third embodiment, the same part as that of the first embodiment will not be described in duplication.

Referring to FIG. 14, after the control device 10 performs the operation of step S506 and step S507, in the same way as step S102 and step S103 shown in FIG. 5, the user inputs, through the operation device 15, the user name in the field 202 and the password in the field 203, and then presses the key 204, on the authentication screen 201. When the key 204 is pressed, the control device 10 decides that the instruction to execute the first authentication has been received (YES at step S508).

When the user name and the password inputted as the authentication information accord with the user name and the password stored in advance in the HDD 19 as the first authentication information, the control device 10 decides that the user may log in (YES at step S510), and performs the operation of step S503 to step S505 as described above.

(2-1) When First Authentication is Already Done

It is assumed here that the user of the image forming apparatus 1A completed the first authentication process before inputting the instruction to print the status page, and that the image forming apparatus 1A has just finished the printing by the copying function. Referring to FIG. 14, the control device 10 decides that the user has logged in (YES at step S506), and performs the operation of step S S503 to step S505 as described above.

According to the first to the third embodiments, the control device 10 causes the printing unit 23 to print, on the recording sheet, the first status page 301, including the first information 304 about the printing charge arising from the execution of the printing operation, when the instruction to print the status page, indicating the status of the printing job of the printing unit 23, is received, and when the authentication information inputted through the operation device 15 accords with the first authentication information stored in advance in the HDD 19.

Accordingly, the user can easily acquire the information about the printing charge, and can be exempted from taking the trouble to make an enquiry to the charging system or calculate the printing charge. In addition, the first status page 301 including the first information 304 about the printing charge is printed on the recording sheet, when the authentication information inputted through the operation device 15 accords with the first authentication information stored in advance in the HDD 19. Accordingly, only the user who owns the authentication information that accords with the first authentication information can acquire the first information. Therefore, unspecified persons are restricted from acquiring the first information, unlike in the situation where the first information 304 is printed in all the cases where the instruction to form the status page is received. Consequently, the security for the prevention of information leakage can be enhanced.

According to the first to the third embodiments, the control device 10 causes the display device 16 to display the authentication screen 201 for the user to input the authentication information, when the instruction to print the status page is received, but the authentication information has not been received through the operation device 15.

Accordingly, the user can be urged to input the authentication information in the case where the first authentication has not yet been done. Such an arrangement further ensures that the user who owns the authentication information that accords with the first authentication information can acquire the first information, thereby further improving the user-friendliness of the system.

According to the first embodiment, the control device 10 requests, through the communication device 21, the server apparatus 3 to transmit the second information for calculating the printing charge, corresponding to the first authentication information that accords with the authentication information received through the operation device 15, when the instruction to print the status page is received, and when the authentication information inputted through the operation device 15 accords with the first authentication information stored in advance in the HDD 19. Then the control device 10 causes the printing unit 23, upon receipt of the second information transmitted from the server apparatus 3 in response to the request, through the communication device 21, to print the first status page 301 including the first information 304 about the printing charge calculated from the second information received, on the recording sheet.

Thus, the first information 304 includes the information about the printing charge calculated from the second information corresponding to the authentication information received through the operation device 15, and therefore the user who inputted the authentication information can easily acquire the information about the printing charge relevant to him/herself. Consequently, the user-friendliness of the system can be further improved.

According to the third embodiment, the second authentication information for identifying the manager is stored in advance in the HDD 19, and the control device 10 is configured to accept the selection whether to include the first information in the status page, when the authentication information received through the operation device 15 accords with the second authentication information stored in advance in the HDD 19. The control device 10 causes the printing unit 23 to print the first status page 301 on the recording sheet, when the instruction to print the status page is received, and the selection to include the first information in the status page is received in advance, despite the authentication information not having been received through the operation device 15.

Accordingly, for example, when the selection to include the first information in the status page is made in advance by the manager of the image forming apparatus 1, the user can acquire the first information, despite the first authentication not having been done. In other words, even the user without the authentication information that accords with the first authentication information can acquire the first information, provided that the user is permitted to do so by the manager. Therefore, the user-friendliness of the system can be improved, compared with the case where the users without the authentication information that accords with the first authentication information are restricted from acquiring the first information.

According to the first to the third embodiments, the control device 10 causes the printing unit 23 to print the second status page 401 that does not include the first information 304 on the recording sheet, when the instruction to print the status page is received, and the authentication information inputted through the operation device 15 discords with the first authentication information stored in advance in the HDD 19.

Thus, although the authentication information inputted through the operation device 15 discords with the first authentication information stored in advance in the HDD 19, the user can confirm the status of the printing job of the printing unit 23. Therefore, the user-friendliness of the system can be improved, compared with the case where the status page is not printed at all, when the authentication information inputted through the operation device 15 discords with the first authentication information stored in advance in the HDD 19.

According to the first to the third embodiments, the control device 10 generates the first status page 301 so as to include the information indicating the unit price for printing one recording sheet, and the information indicating the total of the printing charge, in the first information 304. Such an arrangement further facilitates the user to acquire the information about the printing charge, thereby further ensuring that the user is exempted from taking the trouble to make an enquiry to the charging system, or calculate the printing charge.

According to the first to the third embodiments, further, the control device 10 calculates, upon receipt of the information indicating the unit price for printing one recording sheet as the second information, through the communication device 21, the total of the printing charge on the basis of the second information received, and the accumulation information stored in the HDD 19 in association with the first authentication information. Therefore, the user who inputted the authentication information can easily acquire the total of the printing charge relevant to him/herself.

First Variation

Although the first information 304 about the printing charge is expressed by characters in the first to the third embodiments, the present invention is not limited to such embodiments. For example, the first information may be expressed in the form of a QR code (registered trademark).

FIG. 17 illustrates an example of another first status page 601. Referring to FIG. 17, the control device 10 generates the second status page 601, so as to include accumulation information 602 indicating the cumulative sum of the number of printed sheets, with respect to each of the copying function, the printing function, and the facsimile function, and accumulation information 603 indicating the cumulative sum of the number of printed sheets, with respect to each sheet size. The accumulation information 602 and the accumulation information 603 are stored in the HDD 19.

The control device 10 generates the first status page 601, so as to further include first information 604 expressed by a QR code (registered trademark). The first information 604 is based on the second information received from the server apparatus 3 and the accumulation information 602, and includes the information indicating the unit price for printing one recording sheet, specified for each of the copying function, the printing function, and the facsimile function, the information indicating the printing charge calculated by the control device 10 with respect to each of the copying function, the printing function, and the facsimile function, and the information indicating the total amount of the printing charge calculated by the control device 10.

The first information 604 is expressed by the QR code (registered trademark) that can limit the information reading, and can be read by a specific scanner. The specific scanner for reading the first information 604 can only be utilized by predetermined users, such as the users and the manager who own the authentication information that accords with the first or second authentication information registered in advance, or users who belong to the department the information of which is registered. Thus, only those users authorized in advance can acquire the information included in the first information 604, and therefore unspecified persons are more surely restricted from acquiring the first information. Consequently, the security for the prevention of information leakage can be further enhanced.

Other Variations

Although the input device through which the authentication information is inputted is exemplified by the operation device 15, in the first to the third embodiments, the present invention is not limited to such embodiments. For example, the image forming apparatus 1 may include, as an input device, a camera for shooting the face of the user. In this case, the feature of the user's face, such as the positional relation between the eyes and the nose, and the sizes thereof, is stored in advance in the HDD 19, as first or second authentication information. The control device 10 executes the first or second authentication, including deciding whether the feature extracted as the authentication information from the image data of the user's face, shot and inputted by the camera, accords with the feature stored in advance in the HDD 19 as the first or the second authentication information.

Alternatively, the image forming apparatus 1 may include an IC card reader, as an input device. In this case, the control device 10 executes the first or second authentication, including deciding whether the authentication information read and inputted by the IC card reader, from the IC card owned by the user, accords with the first or the second authentication information stored in advance in the HDD 19.

Although the information processing apparatus is exemplified by the server apparatus 3 in the first to the third embodiments, the present invention is not limited to such embodiments. The type of the information processing apparatus is not specifically limited, provided that the apparatus can be connected to the network 4 and is capable of managing the second information, including the charge information. For example, a personal computer connected to the network 4 may be employed.

Although the second information including the charge information is stored in the HDD 33 of the server apparatus 3, in the first to the third embodiments, the present invention is not limited to such embodiments. For example, the second information may be stored in the HDD 19 of the image forming apparatus 1.

Although the second status page 401 is printed, in the first to the third embodiments, when the instruction to print the status page is received, and the authentication information received through the operation device 15 discords with the first authentication information stored in advance in the HDD 19, the present invention is not limited to such embodiments. For example, an error notice screen indicating that the status page is unable to be printed may be displayed on the display device 16, instead of printing the second status page 401.

Although the image forming device 12 is configured to form an image on the recording sheet in the foregoing embodiment, the present invention is not limited to such a configuration. The image forming device 12 may form an image on a different recording medium, other than the recording sheet. For example, an overhead projector (OHP) sheet may be employed, to form an image.

The present invention may be modified in various manners, without limitation to the foregoing embodiments. For example, although the color MFP is taken up in the foregoing embodiments as an example of the image forming apparatus according to the present invention, the disclosure is also applicable to various other image forming apparatuses, such as a monochrome MFP, a printer, a copier, and a facsimile machine.

Further, the configurations and processings described in the foregoing embodiments with reference to FIG. 1 to FIG. 17 are merely exemplary, and in no way intended to limit the present invention to those configurations and processings.

What is claimed is:

1. An image forming apparatus comprising:
an image forming device that executes an image forming operation to form an image on a recording medium;
a storage device in which first authentication information for identifying a user is stored in advance;
an input device through which authentication information is inputted; and
a control device that includes a processor and functions, through the processor executing a control program, as to:
generate a first status page including a unit price for image forming on one recording medium, a cumulative number of the recording media on which the image forming operation has been performed, and a total of a charge arising from execution of the image forming operation, and causes the image forming device to form, on the recording medium, the first status page, when an instruction to form a status page has been received, and the authentication information received through the input device and the first authentication information stored in the storage device in advance have been accorded with each other, and
generate a second status page including the cumulative number of the recording media and not including the unit price and the total of the charge, and causes the image forming device to form the second status page, on the recording medium, when the instruction to form the status page has been received, and the authentication information has been discorded with the first authentication information.

2. The image forming apparatus according to claim 1, further comprising a display device,
wherein the control device causes the display device to display a screen for inputting the authentication information, when the instruction to form the status page has been received, and the authentication information has not been received through the input device.

3. The image forming apparatus according to claim 1, further comprising a communication device that communicates, via a network, with an information processing apparatus that manages the information indicating the unit price, with respect to each of the first authentication information,
wherein the control device requests, through the communication device, the information processing apparatus to transmit the information indicating the unit price corresponding to the first authentication information that accords with the authentication information received through the input device, when the instruction to form the status page has been received, and the authentication information received through the input device has been accorded with the first authentication information stored in advance in the storage device, and
the control device causes the image forming device, upon receipt, through the communication device, of the information indicating the unit price transmitted from the information processing apparatus in response to the request, to form the first status page including the total of the charge calculated from the information indicating the unit price received, on the recording medium.

4. The image forming apparatus according to claim 1,
wherein second authentication information for identifying a manager is also stored in advance in the storage device,
the control device can accept selection whether to include the unit price and the total of the charge in the status page, when the authentication information received through the input device accords with the second authentication information stored in advance in the storage device, and the control device causes the image forming device to form the first status page on the recording medium, when the instruction to form the status page has been received, and the selection to include the unit price and the total of the charge in the status page has been received in advance, despite the authentication information not having been received through the input device.

5. The image forming apparatus according to claim 3, wherein accumulation information indicating the cumulative number of the recording media is stored in the storage device, in association with the first authentication information, and the control device calculates, upon receipt of the information indicating the unit price through the communication device, the total of the charge on a basis of the information indicating the unit price received, and the accumulation infor-mation stored in the storage device.

6. The image forming apparatus according to claim 1,

Wherein the control device generates the first status page including the cumulative number of the recording media and the code expressing the unit price and the total of the charge.

\* \* \* \* \*